3,787,479
PROCESS FOR THE CONTINUOUS TRANSESTERI-
FICATION OF DICARBOXYLIC ACID ALKYL
ESTERS WITH DIOLS
Wolfgang Grehl, Chur, Grisons, Switzerland, Wolf-
Diether Hahn, Frankfurt am Main, Germany, and
Bernhard Stoll, Domat-Ems, Grisons, Switzerland, as-
signors to Inventa A.G. fur Forschung und Patent-
verwertung, Zurich, Switzerland
Filed May 20, 1970, Ser. No. 47,782
Int. Cl. C07c 69/82
U.S. Cl. 260—475 P                  18 Claims

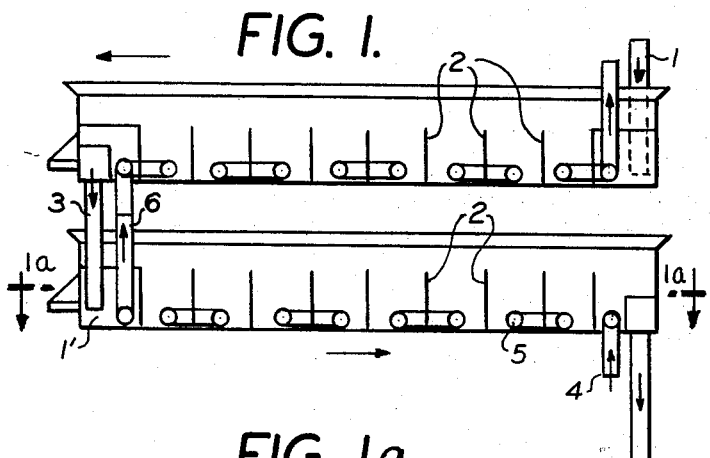
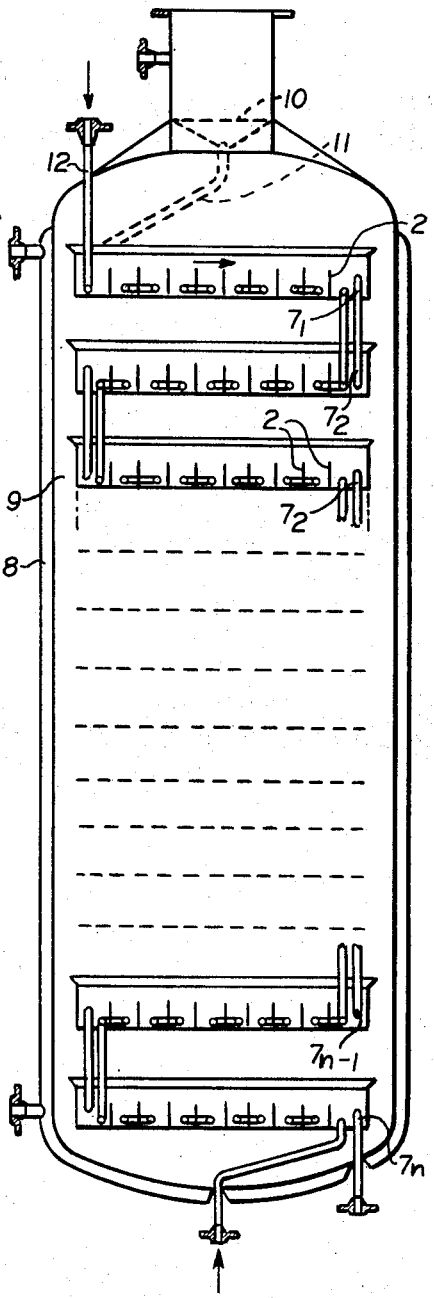
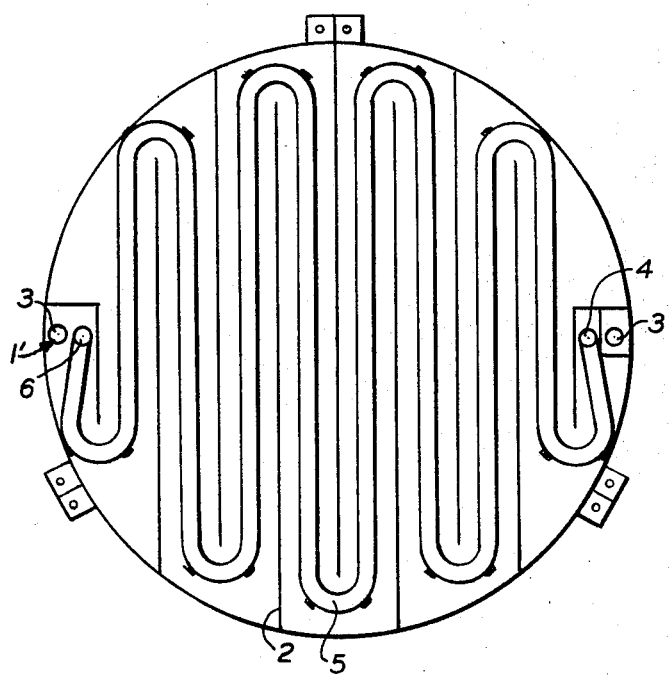
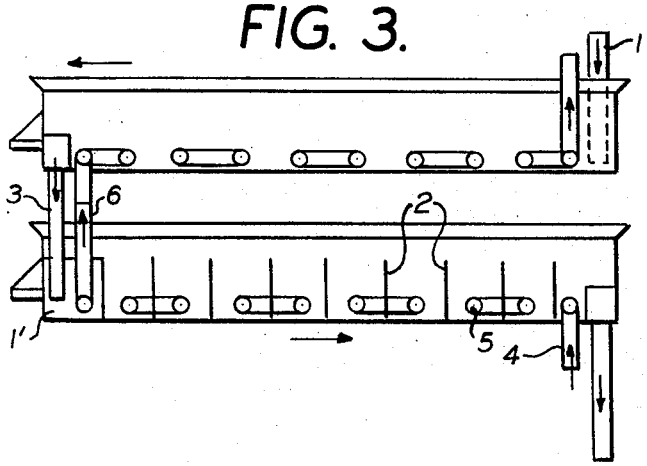
INVENTORS
WOLFGANG GRIEHL
WOLF-DIETHER HAHN
BERNHARD STOLL United States Patent Office 3,787,479
Patented Jan. 22, 1974

ABSTRACT OF THE DISCLOSURE

Transesterification of alkyl esters of a dicarboxylic acid and a diol aided by a metal salt catalyst wherein the reaction medium is passed through an elongated reaction zone in plug-like flow (little back-mixing of the reaction medium), wherein some of the transesterification product is maintained present at the inlet end of the reaction zone. Thereby inactivation of the catalyst is prevented.

BACKGROUND

The invention relates to a process for the continuous transesterification of dicarboxylic acid alkyl esters with diols, especially of dimethylterephthalate with ethylene glycol, in the presence of metal salt catalyst, the transesterification being performed in a reactor with at least one open, indirectly heated trough, especially in a reactor after Austrian Pat. No. 258,580, and the volatile compounds yielded being removed from the reaction area.

In transesterifications of this kind it is necessary that the reaction take place with sufficient speed. The transesterification products (oligomers develop in addition to the transesterification products such as bis-(β-hydroxyethyl)-terephthalate), are to be of such a nature that their polymerization will produce as clear a product as possible with a high molecular weight and a high melting point.

It is in the prior art, in meeting these requirements, to use advantageously as catalysts those metal compounds which have good solubility in addition to a strong catalytic action. Such compounds are, for example, acetates such as cobalt acetate, zinc acetate and lead acetate (see, for example, U.S. Pat. No. 2,641,592).

The various properties and actions of the individual catalysts are best utilized by combining catalysts into catalyst systems. An easily soluble catalyst mixture of this kind is described in German "Auslegeschrift" 1,273,196.

Furthermore, it is known that a slight excess of diol, e.g. ethylene glycol, is advantageous in the transesterification reaction because that shifts the equilibrium of the reaction towards the formation of the bis-ester, e.g. the bis-glycol ester.

Multistage reaction apparatus are usually used for the transesterification. Such a reactor is described, for example, in W. German Pat. No. 1,189,060. The purpose of these apparatus is to achieve a narrow residence time spectrum, i.e. to reduce back flow or mixing which increases the variation in residence time between the molecules in the system.

Reaction apparatus which permits plug-like flow of the reaction product, and thereby a narrow residence time spectrum, is gaining increasing importance. Such reactors offer advantages in the control of the reaction, one such reactor being described in Austrian Pat. No. 258,580.

THE INVENTION

It has been found that, when reaction apparatus which have an especially narrow residence time distribution are used, a more or less great part of the catalyst is precipitated as an insoluble compound at the beginning of the transesterification reaction. The amount of precipitation differs with the catalyst used and also with the conditions of operation.

Part of the precipitated catalyst is deposited on the walls of the reactor, and part of it passes through the reaction apparatus and leads to trouble in the further processing of the transesterification product. Another disadvantage consists in the fact that these precipitated catalysts lead to catalyst losses which decrease the speed of the transesterification reaction and diminish the yield of transesterification product.

The invention is directed to the problem of reaction dicarboxylic acid alkyl esters, especially diesters, with diols, especially of reacting dimethylterephthalate with ethylene glycol, at a high rate of reaction and great yields of transesterification product, in the presence of metal salts as catalyst.

This problem is solved according to the invention by performing the transesterification in the presence of some already transesterified product in order to prevent the formation of insoluble and hence catalytically deactivated metal compounds.

In summary, the invention is concerned with the transesterification of alkyl esters of a dicarboxylic acid and a diol, wherein said ester and diol and a metal salt transesterification catalyst as a reaction medium are passed through an elongated reaction zone, having an inlet end at which the ester and diol are introduced and an outlet end from which the transesterification product is withdrawn. The catalyst tends to react and impart turbidity to the reaction medium during passage thereof through the reaction zone. The invention provides the improvement which comprises maintaining transesterification product present at the inlet end of the reaction zone in an amount effective to prevent said reaction of the catalyst.

According to a further development of the invention, the transesterified product is returned to the place of catalyst infeed by removing the partitions on the tray of the first trough of the reactor.

According to another modification of the invention, the transesterified product is taken from the sump of the reactor and returned to the tray of the first trough.

The apparatus used in the practice of the invention is a tray column for transesterification reactions comprising a plurality of vertically spaced trays, an inlet and an outlet for each tray for passage of the reaction medium across the trays and downwardly through the column from tray to tray. Separators are provided on the trays, defining an elongated, winding trough for plug-like flow of the reaction medium, providing a narrow residence time spectrum for the reactants during passage through the column. The invention provides the improvement of a relatively open area on the top tray free of separators, adjacent the top tray inlet, permitting back flow of the medium in the vicinity of the top tray inlet so that transesterification product is present at the inlet to the top tray.

An apparatus according to Austrian Pat. No. 258,580 has proven to be especially suitable for the performance of the process of the invention. It is represented diagrammatically in FIGS. 1, 1a and 2, and will be further described as follows.

BRIEF DESCRIPTION OF THE DRAWINGS

FIG. 1 is a vertical section through a so-called residence time tray;
FIG. 1a is a cross-section through such a residence time tray on line 1a—1a in FIG. 1;

FIG. 2 is a vertical section through the entire reactor; and

FIG. 3 shows a part of a multi-tray column in which the separators have been removed from the top tray.

EMBODIMENTS

The residence time tray of FIG. 1 is fed at 1 with transesterification product, and adjacent to pipe 1, the reactants and catalyst are introduced into the tray. The said materials form a mixture which flows substantially in the direction of the arrow through the trough formed by the partitions 2, and passes through an overflow tube 3 into the residence time tray beneath at point 1'. Countercurrently thereto, the heating medium is fed to the lower residence time tray at point 4 from the next tray down, flows through the tube coil 5 countercurrently to the product, and at 6 passes into the next tray up.

This results in the structure of the entire reactor as shown in FIG. 2, where any desired number of residence time trays 7–7n, depending on the throughput and temperature distribution, and on the geometrical dimensions of the individual tray, are disposed one over the other like the trays of a distillation column, except that between the periphery of the tray and the heated jacket 8 of the column there remains a gap 9 which permits the unhampered passage of the vapors that form on the trays to the head of the column of the reactor without coming directly into contact with the product. In this way, the volatile compounds are removed from the reaction zone.

Only at the head of the column is the mixture of all of the vapors rising from the individual trays fractionally condensed by a condenser (not shown), the dimethylterephthalate and/or, e.g. bis-($\beta$-hydroxy-ethyl) - terephthalate, being condensed, collected in funnel 10 and delivered back to the top tray via pipe 11. The reactants are introduced via pipe 12, and the catalyst is introduced adjacent pipe 12 via a pipe not shown. The alcohol that is yielded, e.g., glycol and methanol, is removed in vaopr form from the system and then condensed.

As noted above, FIG. 3 indicates a column construction in which separators 2 are not installed on the top tray so htat by reason of back-mixing transesterification product is present at the beginning of the reaction time.

First a test was made on a laboratory scale to determine what amount of transesterification product is required in order to prevent the precipitation of the catalyst during the transesterification of dimethylterephthalate with ethylene glycol. The occurrence of turbidity was considered as the criterion of the formation of insoluble metal compounds. Each batch was refluxed under constant conditions. The amount of ethylene glycol amounted in each case to 100 g. The results are summarized in the following table. By "transesterification product," in the table and elsewhere herein is meant the diester produced in the transesterification reaction.

TABLE 1

| Catalyst | Dimethyl-terephthalate, g. | Transesterification product, g. | Quantity of catalyst, g. | Turbidity |
| --- | --- | --- | --- | --- |
| Cobalt acetate | None | None | 0.3 | Yes. |
|  | None | None | 0.6 | Yes. |
|  | None | None | 2.0 | Yes. |
|  | None | 2 | 1.0 | Yes. |
|  | None | 250 | 0.150 | No. |
|  | None | 100 | 0.090 | No. |
|  | None | 50 | 0.060 | No. |
|  | None | 15.5 | 0.043 | No. |
| Lead acetate | None | None | 0.3 | Yes. |
|  | None | 10.0 | 0.3 | No. |
|  | 50 | None | 0.3 | Yes. |
|  | 50 | 10.0 | 0.3 | No. |
| Zinc acetate | None | None | 0.3 | Yes. |
|  | None | 10.0 | 0.3 | No. |
|  | 50 | None | 0.3 | Slight. |
|  | 50 | 10.0 | 0.3 | No. |
| Cobalt acetate | None | None | 0.3 | Yes. |
|  | None | 10.0 | 0.3 | No. |
|  | 50 | None | 0.3 | Slight. |
|  | 50 | 10.0 | 0.3 | No. |

EXAMPLE 1

18.0 kg./h. of dimethylterephthalate and 9.2 kg./h. of ethylene glycol were fed continuously to the first tray of the transesterification reactor according to Austrian Pat. No. 258,580, from which the partitions forming the troughs had been removed (FIG. 3). 0.3 mole of cobalt acetate per mole of dimethylterephthalate was fed in together with the ethylene glycol. When the transesterification product was analyzed, 0.295 mmole of cobalt was found per mole of dimethylterephthalate.

In a comparative experiment performed under the same conditions but without removing the partitions of the top tray, only 0.21 mmole of cobalt was found per mole of dimethylterephthalate. 30% of the cobalt put in had thus been lost. After the experimental apparatus was shut down, a deposit was found on the first tray consisting substantially of cobalt oxide.

EXAMPLE 2

Example 1 was repeated, but 0.5 mmole of zinc acetate per mole of dimethylterephthalate was used instead of 0.3 mmole of cobalt acetate per mole of dimethylterephthalate. The rest of the conditions of operation remained the same. All of the zinc acetate was found in the analysis of the transesterification product, within the margins of error; i.e., precipitation no longer took place.

In a comparative experiment performed under the same conditions, but without the removal of the separators forming the trough from the first tray of the reactor, only 50% of the input catalyst was found in the transesterified product.

EXAMPLE 3

17.0 kg./h. of dimethylterephthalate and 9.2 kg./h. of ethylene glycol were fed continuously to the top tray of the transesterification reactor according to Austrian Pat. No. 258,580. The catalyst was fed in together with the ethylene glycol in quantities of 0.3 and 0.5 mmole of catalyst per mole of dimethylterephthalate. Transesterification product was withdrawn from the sump of the reactor by means of a continuously variable proportioning pump and pumped to the top tray of the reactor to the head end of the trough.

The results of the experiments are listed in the following table. Columns 1 to 3 give the experiment number, the nature of the catalyst and the concentration of the latter. The 4th column contains the quantity of recycled transesterification product (defined as above with reference to Table 1) in kg./h. The last column states the amount of catalyst, in percent, which was found in the transesterification product.

TABLE 2

| Experiment No. | Catalyst | Concentration of catalyst in mmole per mole of dimethylterephthalate | Recycled product in kg./h. | Re-found catalyst, percent |
| --- | --- | --- | --- | --- |
| 1 | Cobalt acetate | 0.3 | 0.5 | 89 |
| 2 | do | 0.3 | 2.0 | 96 |
| 3 | do | 0.3 | 3.0 | 100 |
| 4 | do | 0.3 | 5.0 | 100 |
| 5 | Lead acetate | 0.3 | 0.5 | 79 |
| 6 | do | 0.3 | 2.0 | 91 |
| 7 | do | 0.3 | 5.0 | 100 |
| 8 | Zinc acetate | 0.5 | 0.5 | 62 |

The advantages achieved by the invention consist especially in the fact that, in the transesterification of dimethylterephthalate with ethylene glycol with the use of catalysts, the precipitation of the catalyst is substantially prevented. Although the commonly used catalysts, cobalt acetate, zinc acetate and lead acetate, are regarded as readily soluble, in practice it has been found that these catalysts precipitate and become inactive to some extent. The invention is also particularly suitable for processes which make use of apparatus having an especially narrow residence time.

By "mmol" is meant millamol or thousandths of a mol.

The temperature and pressure conditions and other reaction conditions not described herein are those which are conventional for the transesterification reactions.

What is claimed is:

1. In the transesterification of dimethylterephthalate and ethylene glycol wherein said ester and diol and a metal salt transesterification catalyst are combined and passed through an elongated reaction zone in plug-like flow providing a narrow residence time spectrum, for occurrence of the transesterification reaction, and the catalyst tends to react and impart turbidity to said medium during passage thereof the reaction zone, the improvement which comprises maintaining transestrification product present where the ester, diol, and catalyst are combined in an amount effective to prevent said reaction of the catalyst.

2. Process according to claim 1, wherein said catalyst is cobalt acetate, lead acetate, zinc acetate or a mixture of two or all of said acetates.

3. Process according to claim 1, wherein transesterification product is recycled from the outlet of the reaction zone to where the ester, diol, and catalyst are combined to maintain transesterification product present to prevent said reaction of the catalyst.

4. Process according to claim 3, wherein the amount of transesterification product recycled is greater than about 10 weight percent of the ethylene glycol.

5. Process according to claim 4, wherein the amount of product recycled is 10-35 wt. percent of the ethylene glycol.

6. Process according to claim 4, wherein the amount of product recycled is 20-30 wt. percent of the ethylene glycol.

7. Process according to claim 1, wherein the amount of transesterification product present where the ester, diol, and catalyst are combined is greater than about 10 weight percent of the ethylene glycol.

8. Process according to claim 7, wherein the amount of product recycled is 10-30 wt. percent of ethylene glycol.

9. Process according to claim 7, wherein the amount of product recycled is 20-30 wt. percent of the ethylene glycol.

10. Process according to claim 1, wherein transesterification product is maintained present where the ester, diol, and catalyst are combined by back-mixing of ester, diol and catalyst in the vicinity of where the ester, diol, and catalyst are combined.

11. Process according to claim 10, wherein said catalyst is cobalt acetate, lead acetate, zinc acetate or a mixture of two or all of said acetates.

12. Process according to claim 11, wherein the amount of transesterification present where the ester, diol, and catalyst are combined is greater than about 10 wt. percent of the ethylene glycol.

13. Process according to claim 10, wherein the amount of transesterification product present where the ester, diol, and catalyst are combined is greater than about 10 wt. percent of the ethylene glycol.

14. Process according to claim 12, wherein said amount of transesterification product is 10-35 wt. percent.

15. Process according to claim 12, wherein said amount of transesterification catalyst is 20-30 wt. percent.

16. Process according to claim 13, wherein said amount of transesterification product is 10-35 wt. percent.

17. Process according to claim 13, wherein said amount of transesterification catalyst is 20-30 wt. percent.

18. Process which comprises, in a tray column comprising:

(a) a plurality of vertically spaced trays;
(b) at least one inlet and an outlet for each tray for passage of a reaction medium across the trays and downwardly through the column from tray to tray;
(c) separators on at least the trays below the top tray, defining an elongated winding through for plug-like flow of the reaction medium providing a narrow residence time spectrum for the reactants during passage through the column; and having
(d) a relatively open area on the top tray free of separators, adjacent the top tray inlet or inlets, permitting back-mixing of the medium in the vicinity of the top tray inlet or inlets for mixing of medium with materials introduced through the inlet or inlets, transesterifying dimethylterephthalate and ethylene glycol in the column by introducing said ester, said diol and a metal salt transesterification into the inlet or inlets for the formation of said medium and said back-mixing on the top tray and passage of the medium through the column for the transesterification reaction, and withdrawing transesterification product from the bottom tray.

References Cited

UNITED STATES PATENTS 3,676,485    7/1972    Lewis et al.  ------ 260—475 P

FOREIGN PATENTS 822,106    10/1959    Great Britain ------ 260—475 P

LORRAINE A. WEINBERGER, Primary Examiner

E. J. SKELLY, Assistant Examiner

U.S. Cl. X.R.

23—283